United States Patent

Borror et al.

[11] 3,932,186
[45] Jan. 13, 1976

[54] SPECTRALLY SENSITIZED PHOTOGRAPHIC SILVER HALIDE EMULSION

[75] Inventors: Alan L. Borror, Lexington; Ruth Linda Hill, Cambridge; Bernard Zuckerman, Framingham, all of Mass.

[73] Assignee: Polaroid Corporation, Cambridge, Mass.

[22] Filed: Jan. 2, 1974

[21] Appl. No.: 430,222

[52] U.S. Cl. .......................... 96/77; 96/3; 96/29 D; 96/124; 96/137
[51] Int. Cl.² ... G03C 1/40; G03C 1/14; G03C 1/18
[58] Field of Search .......... 96/137, 124, 29 D, 3, 77

[56] References Cited
UNITED STATES PATENTS

| | | | |
|---|---|---|---|
| 3,264,110 | 8/1966 | Depoorter et al. | 96/137 |
| 3,468,661 | 9/1969 | Libeer et al. | 96/137 |
| 3,726,684 | 4/1973 | Riester et al. | 96/137 |
| 3,734,739 | 5/1973 | Borror | 96/137 |

*Primary Examiner*—J. Travis Brown
*Attorney, Agent, or Firm*—Mart C. Matthews; Philip G. Kiely

[57] ABSTRACT

Improved green-sensitivity is imparted to a photosensitive silver halide emulsion by a benzimidazolothiacarbocyanine dye of the formula:

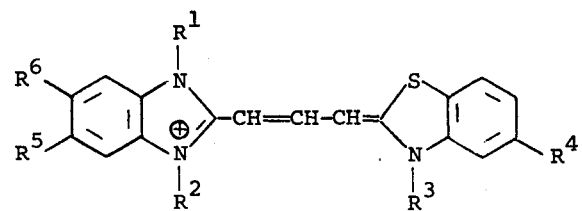

wherein $R^1$ and $R^2$ are lower alkyl; $R^3$ is sulfoalkyl or carboxyalkyl each having an alkylene chain of from 1 to 4 carbon atoms inclusive; $R^4$ is hydrogen, halogen, lower alkyl, lower carbalkoxy, lower alkoxy or acetamido; $R^5$ is halogen, cyano or carbalkoxy; $R^6$ is hydrogen or halogen; Y is an anion customary in the cyanine dye art; and $n$ is 0 or 1.

14 Claims, 4 Drawing Figures

3,932,186

SPECTRALLY SENSITIZED PHOTOGRAPHIC SILVER HALIDE EMULSION

BACKGROUND OF THE INVENTION

1. Field of the Invention

This invention deals with photography and, more particularly, with products and processes wherein photosensitive silver halide emulsions are spectrally (optically) sensitized to the green region of the visible spectrum.

2. Description of the Prior Art

Those skilled in the photograhic art are aware that the photoresponse of an ordinary silver halide emulsion is generally limited to the blue and violet regions of the visible spectrum. However, it has been found that the addition of certain cyanine and related dyes to a silver halide emulsion extends the emulsion's photoresponse approximately to the spectral regions absorbed by said dyes, when said dyes are adsorbed onto the surface of the silver halide crystal. The cyanine dyes are those conforming to an amidinium ion system in which both nitrogen atoms are included in separate heterocyclic ring systems and in which the conjugated chain joining the nitrogen atoms passes through a part of each heterocyclic ring.

Generally speaking, unsymmetrical carbocyanine dyes wherein one of the heterocyclic ring systems is of the benzimidazole series and the other is of the benzothiazole series have previously been described in the art as being useful sensitizers for photographic silver halide emulsions. In the patent literature, such unsymmetrical dyes have been described in, for example, U.S. Pat. Nos. 2,289,300; 2,323,187; 2,778,823; 2,918,369; 3,264,110; and 3,706,570; and British Pat. Nos. 505,979; 955,964; 1,045,777; 1,132,528; and 1,328,239, and Defensive Publication No. T87,016 of application Ser. No. 884,747, filed Dec. 12, 1969 and published May 26, 1970 in 874 O.G. 1022.

However, many of these prior art benzimidazolo-thiacarbocyanine dyes exhibit too much red light absorption to be completely satisfactory as green sensitizers for silver halide emulsions, and others provide green sensitization which in many instances falls short of preferred levels for certain recording applications. Still other dyes may exhibit poor stability, fogging, antisensitization, or incompatability with other components in preferred photographic systems.

The present invention is directed to improved green sensitization of silver halide utilizing specific benzimidazolo-thiacarbocyanine dyes detailed hereinafter, alone or in combination with other cyanine dyes, thereby avoiding the deficiencies of prior art cyanine dyes with similar structure.

BRIEF SUMMARY OF THE INVENTION

It has now been discovered that improved green sensitization is imparted to silver halide by an unsymmetrical benzimidazolo-thiacarbocyanine dye of the formula:

wherein $R^1$ and $R^2$ are lower alkyl (e.g., methyl, ethyl, propyl, etc.); $R^3$ is sulfoalkyl or carboxyalkyl each having an alkylene chain of from 1 to 4 carbon atoms inclusive; $R^4$ is hydrogen, halogen (e.g., chloro, bromo or fluoro), lower alkyl, lower carbalkoxy (e.g., carbmethoxy, carbethoxy, etc.), lower alkoxy (e.g., methoxy, ethoxy, etc.) or acetamido; $R^5$ is halogen, cyano or carboxyalkyl; $R^6$ is hydrogen or halogen; Y is an anion customary in the cyanine dye art and $n$ is 0 or 1.

The sensitization provided by the dyes of this invention to green light, e.g., wavelengths from about 500 nm to about 600 nm, is quite unexpectedly stronger and more desirably distributed than prior art cyanine dyes of very similar structure. These dyes are particularly useful in combination with other known cyanine dyes, e.g., those dyes absorbing in low wavelength green regions to provide uniform sensitivity over the entire green region or with red sensitizers to provide panchromatic emulsions. In addition, photographic emulsions employing the present dyes show excellent shelf-life stability.

The dyes of the present invention have been found to be advantageously employed as green sensitizers for silver halide emulsions which have associated therewith an appropriate color-providing material, e.g., magenta dye developer compound which contains, in the same molecule, both the chromophoric system of a dye and also a silver halide developing function, in a photographic element wherein color reproduction is provided by diffusion transfer techniques.

It is, therefore, an object of the present invention to provide a silver halide emulsion spectrally sensitized to the green region of the visible spectrum by the dyes of Formula I. Other objects of the invention will in part be obvious and will in part appear hereinafter.

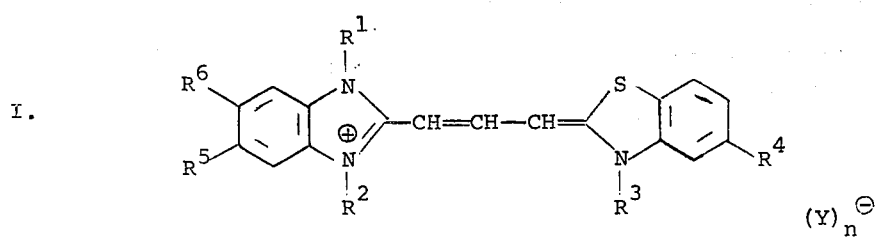

DETAILED DESCRIPTION OF THE INVENTION

Figure 1:
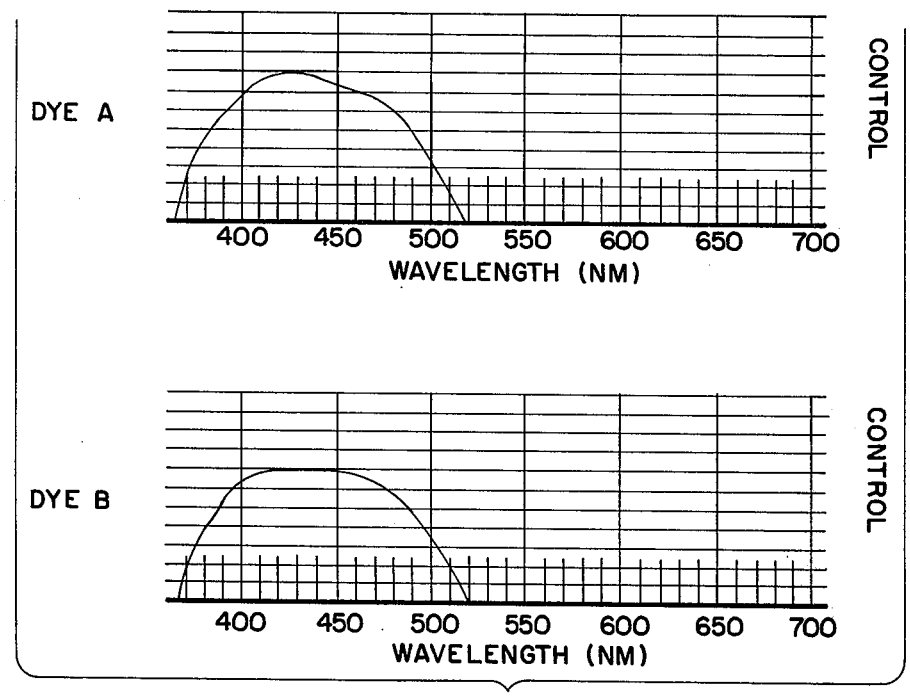
FIG. 1 is a reproduction of control spectrograms showing the spectral sensitivity of two portions of the same gelatino-silver halide emulsion with no spectral sensitizer added.

The term "lower" whenever used herein, including the claims, denotes a group having a hydrocarbon chain of from 1 to 3 carbon atoms, inclusive. For example, a lower alkyl group is an alkyl group having from 1 to 3 carbon atoms, i.e., methyl, ethyl and propyl; lower carbalkoxy denotes carbmethoxy, carbethoxy and carbpropoxy; lower alkoxy denotes methoxy, ethoxy and propoxy; and so forth.

The anion, represented by the designation Y in Formula I, comprises those anionic radicals customarily used in the cyanine dye art when $n=1$, for example, chloride, bromide, iodide, methylsulfate, ethyl sulfate, p-toluenesulfonate, benzenesulfonate, acetate, propionate, cyanate, perchlorate, etc. The most preferred dyes of Formula I have no "external anion", i.e., $n=0$, but instead exhibit an "internal salt" form wherein the anion is the negatively charged form of the $R^3$ group, $-SO_3^\ominus$ or $-COO^\ominus$ and the cation is the positive charge sulfo group, $-SO_3^-G^\oplus$ and the cation is the positive charge shared between the terminal nitrogens of the amidinium ion system. This form is also referred to as the "betaine", "zwitterion", or "anhydro" form. It should be understood that all formulae set forth herein, including those in the claims, represent only an illustration of one form of structure and that the actual cyanine dyes involved are resonance hybirds of a series of structures according to principles well known in the art. It is also to be appreciated that the acid hydrogen of the sulfo or carboxy group of $R^3$ may readily be replaced by an appropriate cation, for example, an alkali metal ion, triethylammonium, etc., when $n=1$.

As previously indicated, $R^3$ may be sulfoalkyl or carboxyalkyl having an alkylene chain of from 1 to 4 carbon atoms. Thus, $R^3$ may be sulfoethyl, γ-sulfopropyl, γ-sulfobutyl, Δ-sulfopropyl, carboxymethyl, carboxyethyl, etc.

From the description hereinafter, it will be appreciated that a requisite function of the dye sensitizers of the present invention is that they be nonmigratory — for were they to diffuse, they might provide a chromatically deleterious effect to the ultimate image formed. In general, the migration propensities of the denoted sensitizers may best be controlled by choosing appropriate alkylene groups in the $R^3$ group of Formula I. Furthermore, it has been found that sensitized silver halide emulsions utilizing cyanine dye materials of the herein-denoted class do not lose spectral sensitization, i.e., are not antisensitized, in the presence of dye developers and other materials commonly utilized in diffusion transfer photographic systems. As will be described in more detail later with examples, it has also been determined that the location of the sulfoalkyl or carboxyalkyl group on the N atom of the benzothiazole nucleus, as opposed to the N atom of the benzimidazole nucleus, is an important factor in obtaining the improved green sensitization shown by the dyes of the present invention.

In general, the cyanine sensitizing dyes of Formula I may be readily synthesized in accordance with the conventional procedures of the art for the production of such compounds. For example, the synthesis procedure for dyes of Formula I may comprise condensing a quaternary compound of the formula:

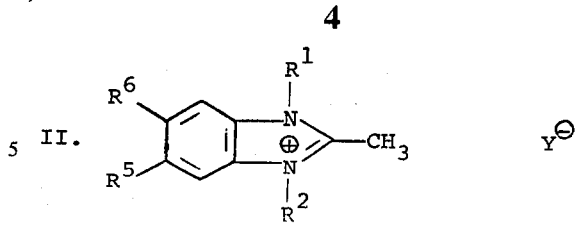

with an amidine, such as N,N-diphenylformamidine, to form the anilino compound; reacting the latter with sodium hydroxide to form the imino compound, condensing the resultant quaternary compound with sulfonyl chloride, and then condensing the resultant quaternary compound with a second quaternary compound of the formula:

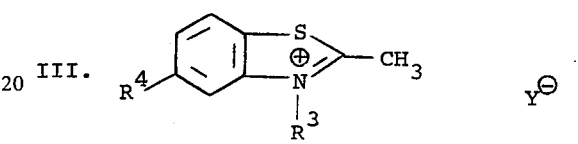

in the presence of a basic condensing agent.

The aforementioned basic condensing agent may be an organic amine, for example, tri-n-propylamine, tri-n-butylamine, triisoamylamine, triethylamine, trimethylamine, dimethylaniline, diethylaniline, pyridine, N-alkyl-piperidine, etc., and most preferably an organic tertiary amine having a dissociation constant greater than pyridine ($1 \times 10^{-5}$); an alkali metal carboxylate in a carboxylic anhydride, for example, sodium acetate in acetic anhydride; etc., or an alkali metal hydroxide, for example, sodium hydroxide, potassium hydroxide, etc. Preferably, the stated condensation reaction takes place in the presence of heat and in a substantially inert reaction medium such as lower molecular weight alcohol, for example, ethyl, n-propyl, isopropyl, n-butyl, or isobutyl alcohol or methoxy ethanol; tricresylphosphate; or a phenol; or a reaction medium itself comprising the condensing agent such as pyridine. A preferred reaction medium is 2-methoxy-ethanol (i.e., methyl cellosolve) and is the subject matter of application Ser. No. 472,274, filed May 22, 1974.

Preferred dyes within Formula I may be represented by the formula:

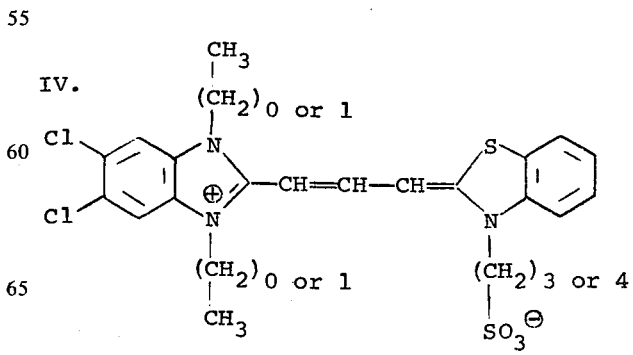

A particularly preferred dye:

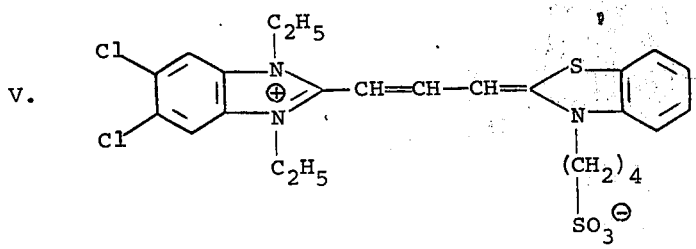

V.

Anhydro-5,6-dichloro-1,3-diethyl-3'-(4''-sulfobutyl)-benzimidazolothiacarbocyanine hydroxide was prepared as detailed in the following example:

Example I

A well-stirred mixture of 113.0 g. (0.21 mole) of 1,3-diethyl-2-[β-(p-tolusulfoanilido)vinyl]-5,6-dichlorobenzimidazolium chloride, 50.3 g. (0.18 mole) of anhydro-2-methyl-3(4'-sulfobutyl)benzothiazolium hydroxide and 36.4 g. (0.36 mole) of triethylamine in 550 ml. of 2-methoxyethanol was refluxed for 45 minutes. At the end of this time, the reaction mixture was cooled to room temperature and the crude dye was removed by suction filtration. This crude dye was refluxed with two 400 ml. portions of methyl cellosolve for thirty minutes to remove dye impurities and by-products. This dye is finally washed thoroughly with ethanol and then dried in vacuo at 70° C. overnight over Drierite. There was obtained 72.0 g. (74%) of anhydro-5,6-dichloro-1,3-diethyl-3'-(4''-sulfobutyl)-benzimidazolothiacarbocyanine hydroxide possessing an m.p. at 300° C. and exhibiting a molar extinction coefficient of 99,000 at a $\lambda_{max}$ at 525 mμ in methyl cellosolve, and an elemental analysis as follows:

|         | C     | H    | N    | S     | Cl    | O    |
|---------|-------|------|------|-------|-------|------|
| Found:  | 54.32 | 4.75 | 7.51 | 11.81 | 12.91 | 8.68 |
| Theory: | 54.34 | 4.92 | 7.61 | 11.56 | 12.84 | 8.69 |

The above-mentioned 1,3-diethyl-2β-(p-tolusulfoanilido)vinyl]-5,6-dichlorobenzimidazolium chloride may be prepared by conventional methods in the art, for example, by following the procedure set forth in British Pat. No. 955,964, particularly Preparation No. 6 therein. The anhydro-2-methyl-3-(4'-sulfobutyl)-benzothiazolium hydroxide may also be prepared in a known manner, for example, by heating a mixture of 2-methylbenzothiazole and 1,4-butane sultone at an internal temperature of 120°–125° C. for about 22 hours.

As examples of other benzimidazolo-thiacarbocyanine dyes contemplated by the present invention, mention may be made of the following:

VI.
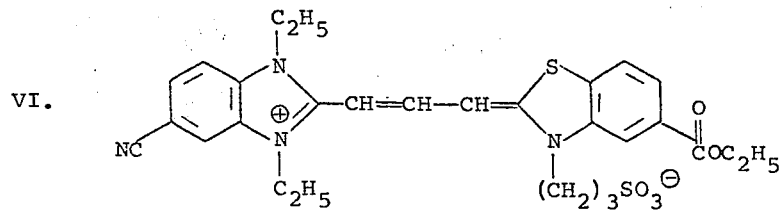

VII.
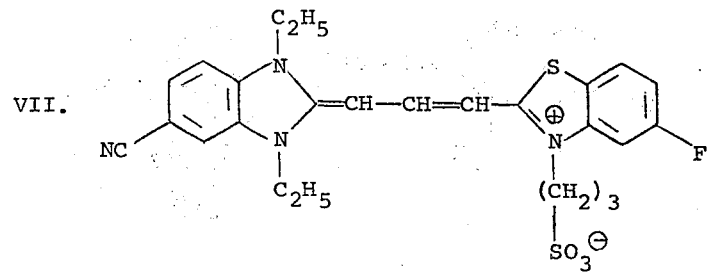

VIII.
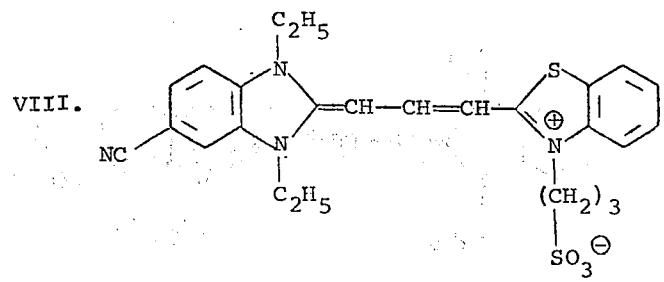

IX. 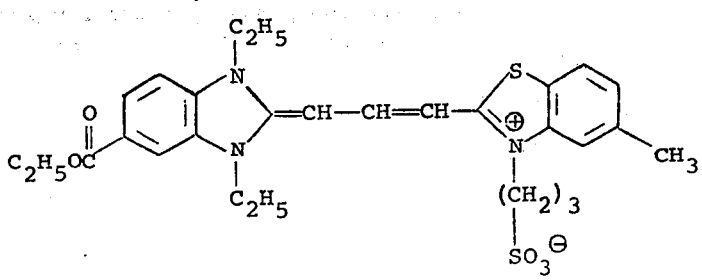
X. 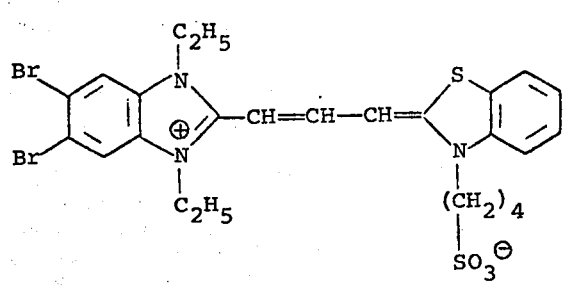
XI. 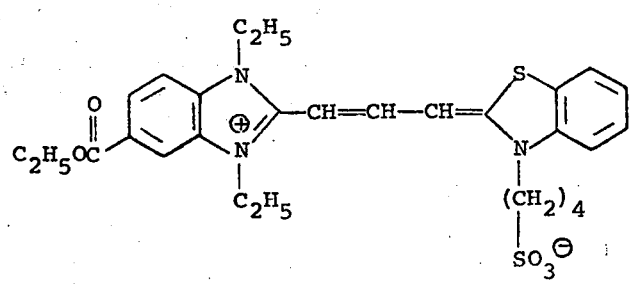
XII. 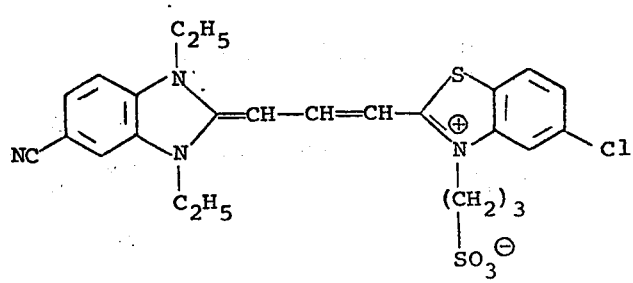
XIII. 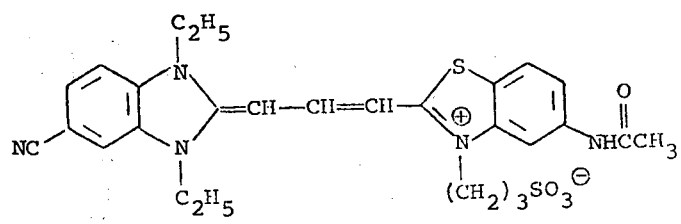

XIV. 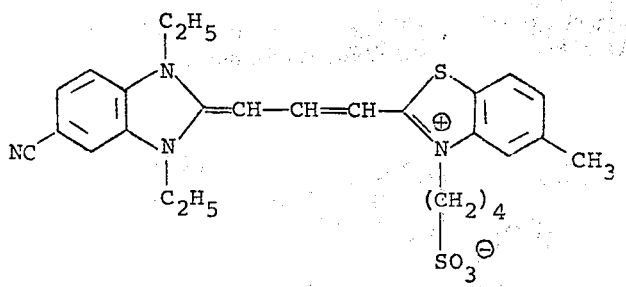

XV. 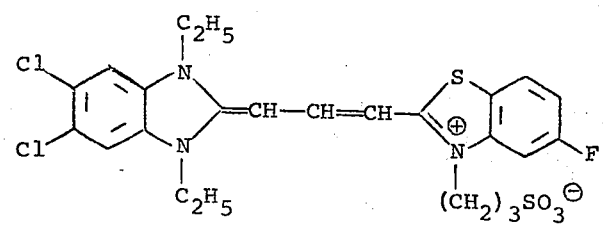

XVI. 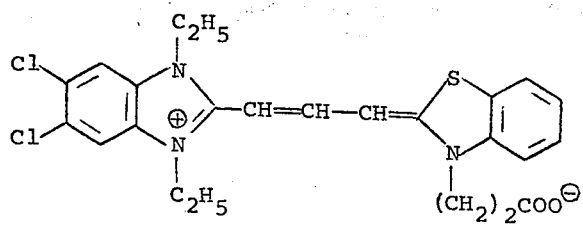

The techniques of incorporating sensitizing dyes such as those of the present invention into photographic silver halide emulsions are well known and disclosed in the art. Typically, the dye is dissolved, or otherwise distributed, in a suitable medium, such as methanol, trifluoroethanol, or pyridine and an appropriate amount of the resulting solution is added to a flowable silver halide emulsion and stirred or otherwise agitated until the dye is uniformly dispersed throughout the emulsion. The sensitized emulsion thus prepared may then be coated, exposed, and developed according to usual photographic techniques.

Common photographic practice is to incorporate the dye into the silver halide emulsion at that concentration producing the maximum sensitization, and the concentration of dye may vary over wide limits depending upon the characteristics of the particular silver halide emulsion and the sensitizing effects desired. The typical range of concentration for the dyes of Formula I is from about 1 to about 4 mg per gram of silver halide measured as silver, and preferably on the order of about 1.5 mg per gram of silver halide measured as silver. As will be apparent to those of ordinary skill in the art, the optimum concentration for any particular emulsion or photographic system may be readily determined by routine experimentation.

The preferred sensitizing dyes of this invention impart sensitivity to silver halide in the long wavelength spectral range from about 550 nm to about 600 nm and exhibit a broad peak of sensitivity at about 575 nm. In addition, the subject dyes provide green sensitized silver halide emulsions and photographic elements which show excellent shelf-life stability and show relatively little, if any, fogging in fresh or incubated emulsions. The spectral placement and distribution of the sensitivity imparted to silver halide by dyes of this invention make them particularly useful, for example, in combination with sensitizing dyes which sensitize silver halide to low green wavelengths, i.e., from about 500 nm to about 550 nm, to provide a uniform and continuous extension of sensitivity over the entire green region, or in combination with red or panchromatic sensitizers to provide panchromatic response extending from about 510 mμ to about 680 mμ. Data showing the advantageous sensitization of dyes of the present invention in comparison with similar dyes of the prior art are set forth in the examples hereinafter.

As examples of classes of cyanine dyes which have been found to form particularly advantageous green sensitizing dye combinations with the dyes of Formula I, mention may be made of symmetrical benzoxazolocarbocyanine dyes, e.g., those described in copending application Ser. No. 430,223, filed Jan. 2, 1974, preferred dyes of which may be represented by the following formulae:

XVII.
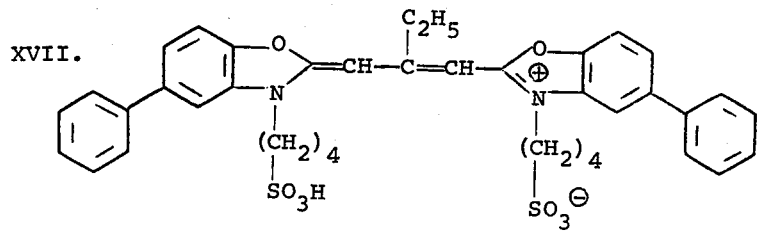

XVIII.
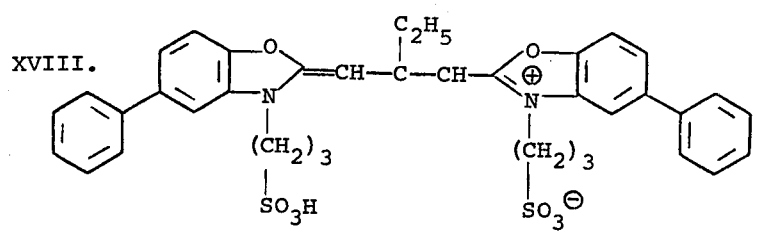

and simple 2'-cyanine dyes, e.g., those described in copending application Ser. No. 214,745, filed Jan. 3, 1972, preferred dyes of which may be represented by the formulae:

XIX.
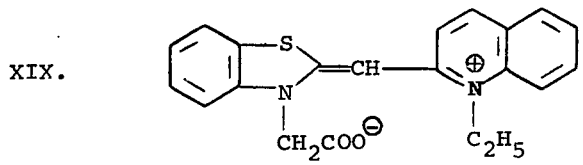

XX.
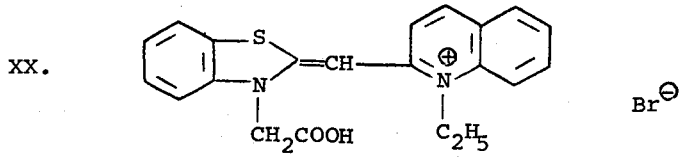

XXI.
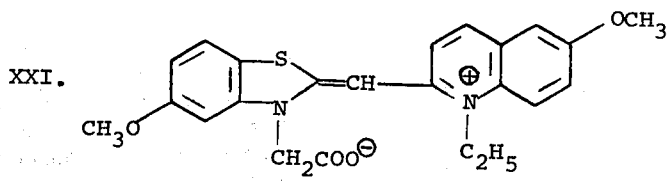

XXII.
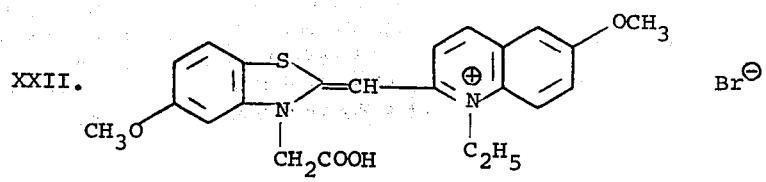

XXIII. 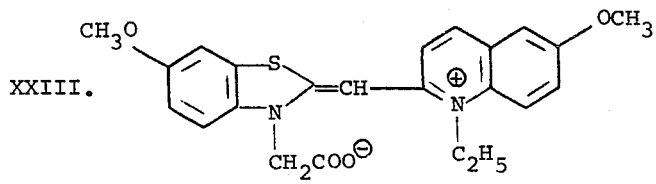

XXIV. 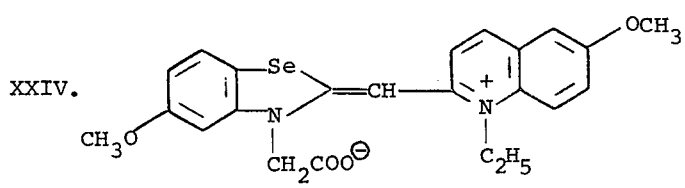

A particularly preferred green sensitizing combination comprises a dye of Formula I, a dye of Formula XIX and a dye of Formula XXII.

As an example of a class of red sensitizers which has been found to form particularly advantageous panchromatic sensitizing dye combinations with the dyes of Formula I, mention may be made of symmetrical benzothiazolocarbocyanine dyes, e.g., those generally disclosed in U.S. Pat. No. 2,503,776. A particularly preferred dye of this class is represented by the formula:

XXV. 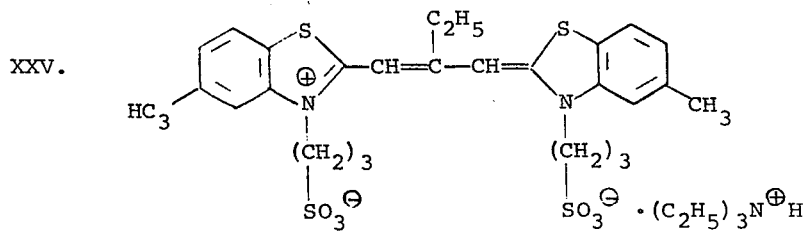

The techniques of incorporating the above-mentioned combinations of dyes into photographic silver halide emulsions are substantially the same as those previously outlined for a single sensitizing dye. Each of the dyes may be individually or collectively distributed at the desired concentrations in an appropriate medium and then slowly added in the desired sequence to and uniformly dispersed in a flowable silver halide emulsion.

The photoresponsive material of the photographic emulsion will preferably comprise one or more of the silver halides such as silver chloride, silver iodide, silver bromide, or mixed silver halides such as silver chlorobromide, silver iodobromide, silver chlorobromoiodide, or mixtures thereof, of varying halide ratios and varying silver concentrations.

The silver halide crystals may be prepared by reacting a water-soluble silver salt, such as silver nitrate, with at least one water-soluble halide, such as ammonium, potassium or sodium bromide, preferably together with a corresponding iodide, in an aqueous solution of a peptizing agent such as a colloidal gelatin solution; digesting the dispersion at an elevated temperature, to provide increased crystal growth; washing the resultant dispersion to remove undesirable reaction products and residual water-soluble salts by chilling the dispersion, noodling the set dispersion, and washing the noodles with cold water, or alternatively, employing any of the various flocculation systems or procedures, adapted to effect removal of undesired components; afterripening the dispersion at an elevated temperature in combination with the addition of gelatin and various adjuncts, for example, chemical sensitizing agents; all according to the traditional procedures of the art as described, for example, in Neblette, C. B., *Photography Its Materials And Processes*, 6th, Ed., 1962.

As the binder for the emulsion, the aforementioned gelatin may be, in whole or in part, replaced with some other natural colloidal material such as albumin; casein; or zein, or synthetic resins such as cellulose derivatives, polyacrylamides, and vinyl polymers.

Additional optional additives, such as coating aids, hardeners, viscosity-increasing agents, stabilizers, preservatives, and the like, also may be incorporated in the emulsion formulation, according to the conventional procedures known in the photographic emulsion manufacturing art and described in a multiplicity of U.S. and foreign patents. Examples of such optional additives include chemical sensitizers (e.g., reducing agents, sulfur, selenium or tellurium compounds; gold, platinum or palladium compounds, or combinations of these), stabilizers and antifoggants (e.g., noble metal salts such as rubidium, rhodium, palladium, iridium and platinum; mercury compounds; triazoles; azaindenes; disulfides; benzothiazolium compounds; zinc and cadmium salts; mercapto compounds, etc.), speed-increasing compounds (e.g., quaternary ammonium compounds, polyalkylene glycols, thiopolymers and thioethers, cationic surface active agents, or combinations of these), hardening agents (e.g., inorganic agents providing polyvalent metallic atoms such as potash alum and chrome alum; aldehydes such as formaldehyde, glyoxal, mucochloric acid; blocked aldehydes; ketones; quinones; carboxylic and carbonic acid derivatives; sulfonate esters; sulfonyl halides, vinyl sulfones, active halogen compounds; epoxy compounds, aziridines; active olefins, isocyanates, carbodiimides; mixed function hardeners and polymeric hardeners such as oxidized polysaccharides; etc.), coating aids (e.g., saponin; a polyethylene glycol; a polyethylene glycol ether; a taurine; a maleopimarate; an amino acid; a sulfosuccinate; a polyether; a gelatin plasticizer such as glycerin; a dihydroxyalkane; a bisglycolic acid ester; a succinate; a polymeric hydrosol; silicone resins; alkyl aryl sulfonates; etc.), auxiliary developing agents (e.g., hydroquinones such as 4'-methylphenylhydroquinone, catechols, aminophenols, 3-pyrazolidone, ascorbic acid and its derivatives, reductones and phenylenediamines, or combinations of developing agents); and the like.

The emulsion may be coated onto various types of rigid or flexible supports, for example, glass, paper, metal, polymeric films of both the synthetic types and those derived from naturally occurring products, etc. Especially suitable materials include paper; aluminum; polymethacrylic acid, methyl and ethyl esters; vinyl chloride polymers; polyvinyl acetals; polyamides such as nylon; polyesters such as the polymeric films derived from ethylene glycol terephthalic acid; polymeric cellulose derivatives such as cellulose acetate, triacetate, nitrate, propionate, butyrate, acetatebutyrate, or acetate-propionate; polycarbonates; polystyrenes; etc.

The emulsions of this invention can be coated by the various coating procedures in the art such as dip coating, air knife coating, curtain coating, extrusion coating, etc.

Emulsions spectrally sensitized as described herein are useful in a variety of photographic processes, for example, in colloid transfer processes such as described in Yackel et al U.S. Pat. No. 2,716,059; silver salt diffusion transfer processes such as described in Rott U.S. Pat. No. 2,352,014, Land U.S. Pat. No. 2,543,181, Yackel U.S. Pat. No. 3,020,155 and Land U.S. Pat. No. 2,861,885; color image transfer processes such as described in Rogers U.S. Pat. Nos. 3,087,817; 3,185,567; and 2,983,606; Weyerts U.S. Pat. No. 3,253,915; Whitmore et al. U.S. Pat. Nos. 3,227,550; 3,227,551; and 3,227,552; and Land U.S. Pat. Nos. 3,415,644; 3,415,645; 3,415,646; and imbibition transfer processes as described in Minsk U.S. Pat. No. 2,882,156.

As previously mentioned, the present invention has especially useful employment in subtractive color photographic diffusion transfer processes and products, particularly those color processes which employ dye developers, i.e., compounds possessing the properties of both a dye and a photographic silver halide developing agent. Such processes and products are well known to the photographic art and are disclosed in a multiplicity of U.S. and foreign patents.

Generally speaking, diffusion transfer systems rely for color image formation upon a differential in mobility or solubility of a dye image-providing material obtained as a function of development of exposed silver halide so as to provide an imagewise distribution of such material which is more diffusible and which is therefore selectively transferred, at least in part, by diffusion, to a superposed dyeable stratum to impart thereto the desired color transfer image. The differential in mobility or solubility may, for example, be obtained by a chemical action such as a redox reaction or a coupling reaction.

In any of these systems, multicolor images are obtained by employing a film unit containing at least two selectively sensitized silver halide emulsions each having associated therewith a dye image-providing material exhibiting desired spectral absorption characteristics. The most commonly employed elements of this type are the so-called tripack structures employing a blue-, a green- and a red-sensitive silver halide layer having associated therewith, respectively, a yellow, a magenta and a cyan dye image-providing material. The dye combination of the present invention, as previously indicated, is useful in providing the green-sensitive emulsion of these photographic elements.

Multicolor images may be obtained using the previously mentioned dye developers by several techniques. One such technique contemplates obtaining multicolor transfer images utilizing dye developers by employment of an integral multilayer photosensitive element, such as is disclosed in the aforementioned U.S. Pat. No. 2,983,606, and particularly with reference to FIG. 9 of the patent's drawing, wherein at least two selectively sensitized photosensitive strata, superposed on a single support, are processed, simultaneously and without separation, with a single, common image-receiving layer. Other techniques require the separation of the image-receiving layer from the remainder of the film unit in order to view the image.

A suitable arrangement for the photosensitive element comprises a support carrying a red-sensitive silver halide stratum, a green-sensitive silver halide emulsion stratum and a blue-sensitive silver halide emulsion stratum, said emulsions having associated therewith, respectively, for example, a cyan dye developer, a magenta dye developer and a yellow dye developer. The dye developer may be utilized in the silver halide emulsion layer, for example, in the form of particles, or it may be employed as a layer behind the appropriate silver halide emulsion strata. Each set of silver halide emulsion and associated dye developer strata are disclosed to be optionally separated from other sets by suitable interlayers, for example, by a layer of gelatin or polyvinyl alcohol.

The dye developers associated with the green-sensitive emulsion in the film unit of the present invention are dye image-forming materials which are preferably selected for their ability to provide a color that is useful in carrying out subtractive color photography, that is, the previously mentioned magenta color. The magenta dye developer employed may be incorporated in the silver halide emulsion or, in the preferred embodiment, in a separate layer behind the silver halide emulsion. Such a layer of dye developer may be applied by use of a coating solution about 0.5 to 8% by weight of the dye developer dispersed in a film-forming natural, or synthetic, polymer, for example, gelatin, polyvinyl alcohol, and the like, adapted to be permeated by the chosen diffusion transfer fluid processing composition.

An extensive compilation of specific dye developers particularly adapted for employment in photographic diffusion transfer processes is set forth in aforementioned U.S. Pat. No. 2,983,606 and in the various copending U.S. applications referred to in that patent, especially in the table of U.S. applications incorporated by reference into the patent as detailed in column 27. As examples of additional U.S. patents detailing specific magenta dye developers contemplated for employment in the present invention, mention may also be made of U.S. Pat. Nos. 3,134,672; 3,218,164; 3,563,739; and the like.

Image-receiving elements, particularly adapted for employment in the preceding diffusion transfer processes, comprise a support layer possessing on one surface thereof, in sequence, a polymeric acid layer, preferably an inert timing or spacer layer, and an image-receiving layer adapted to provide a visible image upon transfer to said layer of diffusible dye image-forming substance, such as disclosed in, for example, U.S. Pat. No. 3,362,819.

It will be apparent that, by appropriate selection of the image-receiving element materials from among suitable known opaque and transparent materials, it is possible to obtain either a colored positive reflection print or a colored positive transparency.

As disclosed in the previously cited patents, the liquid processing composition referred to for effecting multicolor diffusion transfer processes comprises at least an aqueous solution of an alkaline material, for example, diethylamine, sodium hydroxide or sodium carbonate and the like, and preferably possessing a pH in excess of 10, and most preferably, a viscosity-increasing compound constituting a film-forming material of the type which, when the composition is spread and dried, forms a relatively firm and relatively stable film. It will be noted that the liquid processing composition employed may also contain one or more auxiliary or accelerating developing agents, such as p-methylaminophenol, 2,4-diaminophenol, p-benzylaminophenol, hydroquinone, toluhydroquinone, phenylhydroquinone, 4'-methylphenylhydroquinone, etc. Such auxiliary developing agents may be employed in the liquid processing composition or they may be initially incorporated, at least in part, in any one or more of the silver halide emulsion strata, the strata containing the dye developers, the interlayers, the overcoat layer, the image-receiving layer, or in any other auxiliary layer, or layers, of the film unit. It will also be apparent that the relative proportions of the agents of the diffusion transfer processing composition may be altered to suit the requirements of the operator. Thus, it is within the scope of this invention to modify the herein described developing compositions by the substitution of preservatives, alkalies, silver halide solvents, etc., other than those specifically mentioned, and include in the developing composition components such as restrainers, accelerators, etc.

Although the invention has been discussed in detail throughout employing dye developers, the preferred dye imageforming materials, it will be readily recognized that other, less preferred, dye image-providing materials may be substituted in replacement of the preferred dye developers in the practice of the invention. For example, there may be employed dye image-forming materials such as those disclosed in U.S. Pat. Nos. 2,647,049; 2,661,293; 2,698,244; 2,698,798; and 2,802,735, wherein color diffusion transfer processes are described which employ color coupling techniques comprising, at least in part, reacting one or more color developing agents and one or more color formers or couplers to provide a dye transfer image to a superposed image-receiving layer and those disclosed in U.S. Pat. No. 2,774,668 wherein color diffusion transfer processes are described which employ the imagewise differential transfer of complete dyes by the mechanisms therein described to provide a transfer dye image to a contiguous image-receiving layer.

The present invention will be illustrated in greater detail in conjunction with the following examples which set out representative embodiments and photographic utilization of the present invention which, however, are not limited to the details set forth therein and are intended to be illustrative only.

EXAMPLE II

One portion of a gelatino-silver iodobromide emulsion containing approximately 4% iodide and 12.5% silver was left unsensitized, and other portions of the same emulsion were sensitized, essentially as described hereinbefore, with a methyl cellusolve solution of Dye A, anhydro-5,6-dichloro-1,3-diethyl-3'-(4''-sulfobutyl)-benzimidazolothiacarbocyanine hydroxide (Formula V above) at the levels of 1.0 mg, 2.0 mg and 4.0 mg per gram of silver halide measured as silver, respectively. For comparison, corresponding portions of the same emulsion were prepared employing a methanol solution of Dye B, a dye which is anticipated by the prior art (see, for example, British Pat. No. 1,328,239 or U.S. Defensive Publication No. T874,016 of application Ser. No. 884,747, filed Dec. 12, 1969 and published May 26, 1970 in 874 O.G. 1022, particularly Dye Nos. III and IV therein). Dye B was anhydro-5,6-dichloro-1,3'-diethyl-3-(3-sulfopropyl)-benzimidazolothiacarbocyanine hydroxide and differs from the dyes of the present invention only in regard to the placement of the sulfoalkyl group, i.e., the sulfoalkyl group of Dye B is attached to the N atom of the benzimidazole nucleus as opposed to being attached to the N atom of the benzothiazole nucleus as in Dye A.

Photosensitive elements were prepared by coating the above-denoted emulsion portions on separate film base supports employing a No. 12 coating rod (which approximates a coverage of about 100 mgs of silver per square foot). Each of these elements were identically exposed in an analytical wedge spectrograph and processed in the same manner according to conventional silver complex diffusion transfer techniques employing the processing composition and image-receiving element from a Polaroid Type 42 Land film unit, commercially available from Polaroid Corporation, Cambridge, Massachusetts. Such elements and processing compositions are described generally in, for example, the aforementioned U.S. Pat. No. 2,543,181. The spectrograms thus processed provided a black and white visual recordation of the spectral sensitivity conferred upon the emulsion by the various levels of each dye.

Figure 2:
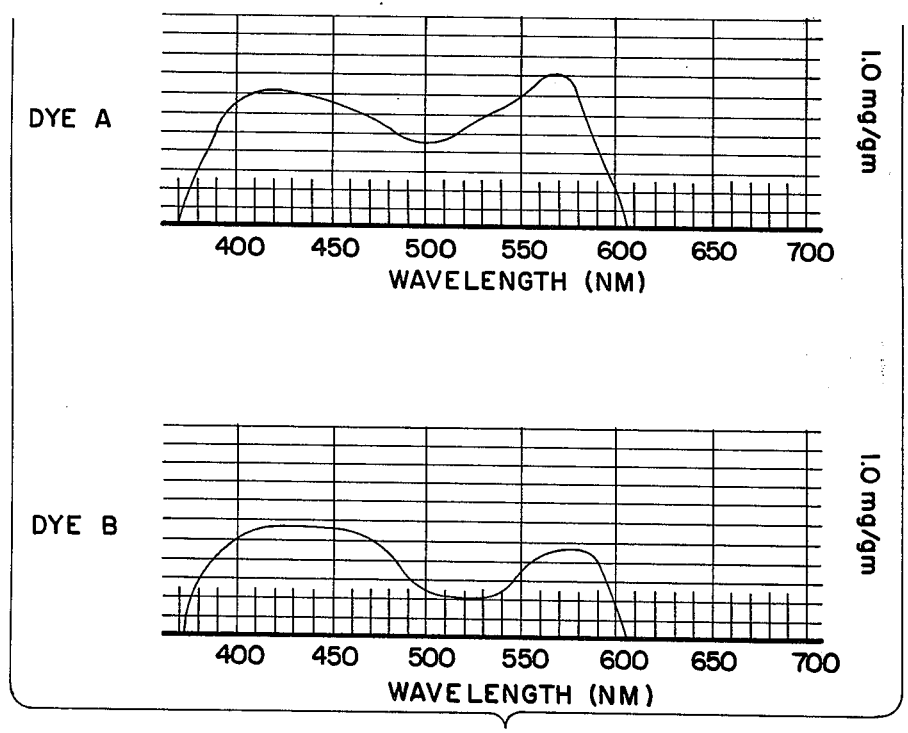
FIG. 2 is a reproduction of a spectrogram as in FIG. 1, but showing a comparison of spectral sensitivity curves of one portion of the above-mentioned emulsion sensitized with Dye A, a dye of the present invention, and another portion of the emulsion sensitized with Dye B, a prior art dye of similar structure, both dyes being present at about 1.0 mgs per gram of silver halide measured as silver.
Figure 3:
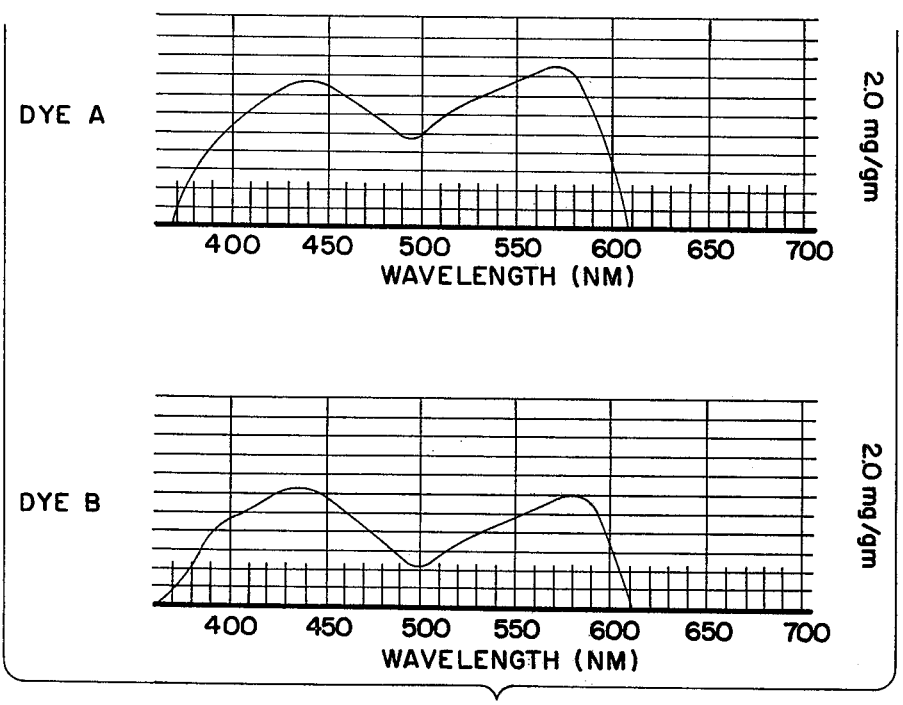
FIGS. 3 and 4 are spectrographic comparisons between the sensitivities imparted to the emulsion by Dyes A and B at levels of 2.0 mgs and 4.0 mgs per gram of silver halide measured as silver, respectively.
Figure 4:
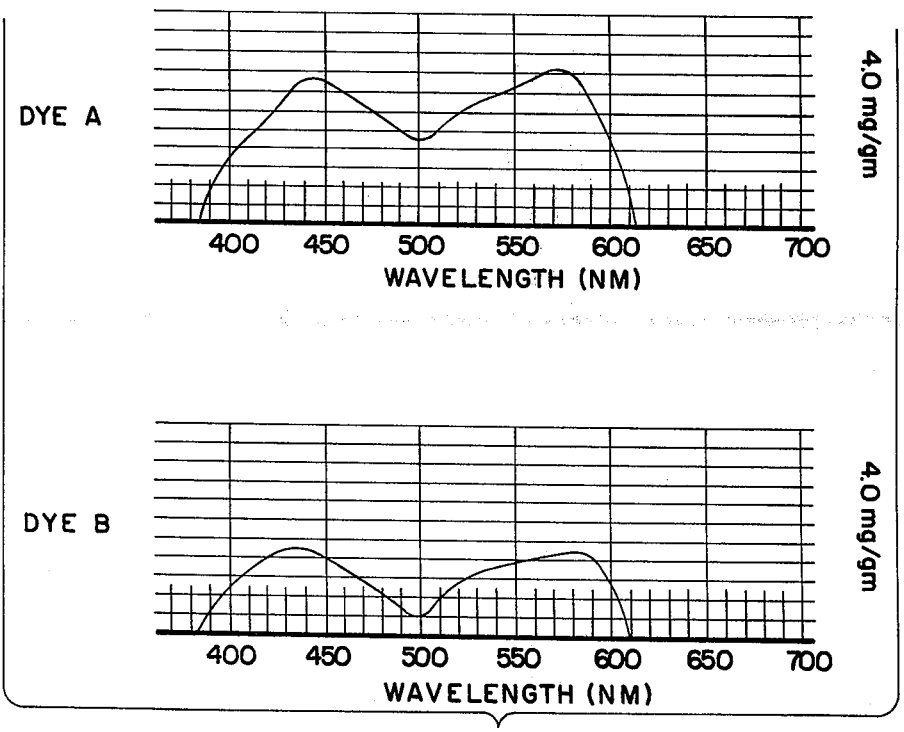

The resultant spectrograms are reproduced in FIGS. 1 through 4. It can be seen from FIG. 1 that the inherent sensitivities of the unsensitized control emulsion portions were essentially identical. A comparison of the spectrograms in FIG. 2 showing the sensitivities imparted to the emulsion by respective 1.0 mg additions of Dyes A and B per gram of silver halide measured as silver will exemplify the improved sensitizing characteristics of the dyes of this invention over prior art dyes of somewhat similar structure. It can be seen in FIG. 2 from the relative heights and intensities of the curves in the region between 550 and 600 nm that Dye A provides noticeably stronger sensitization in this region than does Dye B. In addition, the peak of sensitivity for Dye A is more centrally located within the above-mentioned region at about 575 nm when compared to the peak of sensitivity for Dye B, which is undesirably shifted towards the red region by about 5 to 10 nm. FIGS. 3 and 4 with different levels of each dye show essentially the same results.

EXAMPLE III

Monochromatic color photosensitive elements were prepared corresponding to the black and white elements just described in Example I by coating each respective test and control emulsion portion of Example I at the therein specified coverage over a previously coated magenta dye developer layer containing about 50 mg per square foot of the 1:1 chromecomplexed azo dye developer represented by the formula:

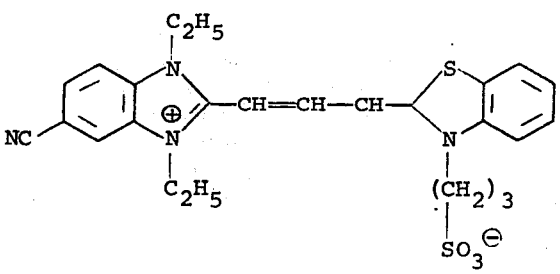

XXVI.

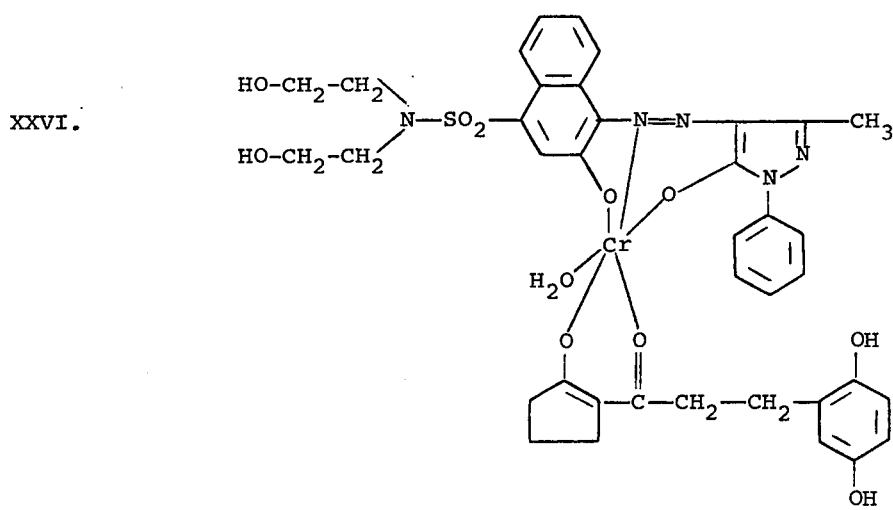

The resultant photosensitive elements were identically exposed in an analytical spectrograph and processed in the same manner according to conventional dye developer diffusion transfer techniques employing the processing composition and image-receiving element from a Polaroid SX-70 Land film unit. Such elements and processing compositions are generally described in, for example, the aforementioned U.S. Pat. No. 3,415,644. The resultant spectrograms detailed essentially the same differences in sensitivities as shown in FIGS. 2–4.

EXAMPLE IV

Test and control portions of a gelatino-silver iodochlorobromide emulsion essentially of the type contemplated by copending application Ser. No. 383,196, filed July 27, 1973, comprising about 11.8% silver, 3% iodide and 12% chloride, were sensitized in accordance with the procedures described above with 1.0 mg, 2.0 mg and 4.0 mg of test Dye C and control Dye D, respectively. The test Dye C was a cyanine dye of the present invention represented by Formula VIII above, i.e., Anhydro-5-cyano-1,3-diethyl-3'-(3''-sulfopropyl)-benzimidazolothiacarbocyanine hydroxide The control Dye D was a cyanine dye anticipated by the prior art (see, for example, U.S. Pat. No. 3,264,110, particularly Examples 8, 10, 11 and 22) and is represented by the formula:

XXVII.

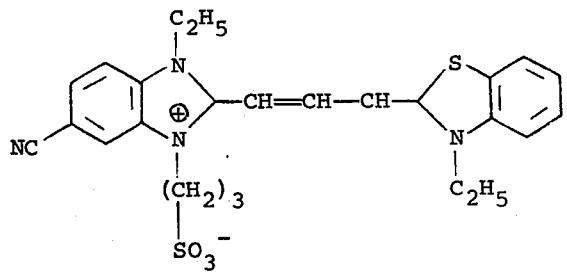

Anhydro-5-cyano-1,3′-diethyl-3-(3″-sulfopropyl)benzimidazolothiacarbocyanine hydroxide Photographic additive color film units were prepared from the sensitized test and control emulsion portions just described in accordance with the procedures generally set forth in, for example, U.S. Pat. Nos. 3,615,426 and 3,615,427. The film units essentially comprised a polyester film base carrying on one surface an additive color screen of approximately 3000 lines per inch comprising a set of primary red filter screen elements, a set of primary blue filter screen elements and a set of primary green filter elements in repetitive side-by-side relationship; a protective polymeric overcoat layer; a receiving layer of a composition comprising deacetylated chitin and 0.25 mg per square foot of cupric sulfide and a layer comprising the test or control sensitized and hardened gelatino silver iodochlorobromide emulsion coated at a coverage of about 100 mgs of silver per square foot.

The above-described film units were identically exposed in a wedge spectrograph and were processed in the same manner by contacting the film unit with a processing composition comprising, as essential major ingredients, about 2226 ccs of water, 174 g of tetramethyl reductic acid, 8 g of triaminophenol HCl, 100 g of carboxymethyl cellulose, 156 g of sodium hydroxide, 52 g of lithium hydroxide, 320 g of sodium thiosulfate, 5.5 g of 2-mercaptobenzothiazole, 132 g of sodium sulfite, 16 g of 6-nitrobenzimidazole, 16 g of 2,6-dimethyl-4-aminophenol HCl, and 254 ccs of a 50% solution of the surfactant Olin 10G.

A comparison of the resultant wedge spectrograms viewed as transparencies revealed that the test Dye C provided noticeably stronger green sensitization than control Dye D. The peak absorptions of the two dyes were observed at substantially the same spectral location, i.e., around 550 nm.

It is thus shown in the above examples that the location of the sulfoalkyl group on the nitrogen atom of the benzothiazole nucleus in the benzimidazolo-thiacarbocyanine dyes disclosed herein is an important factor in obtaining the improved green sensitization provided by the practice of this invention. Prior art benzimidazolo-thiacarbocyanine dyes having the sulfoalkyl group on the nitrogen atom of the benzimidazole nucleus rather than on the benzothiazole nucleus quite unexpectedly do not show this improved sensitization.

Since certain changes may be made in the above product and process without departing from the scope of the invention herein involved, it is intended that all matter contained in the above description and examples shall be interpreted as illustrative and not in a limiting sense.

What is claimed is:

1. A photosensitive silver halide emulsion containing as a green sensitizer a benzimidazolo-thiacarbocyanine dye of the formula:

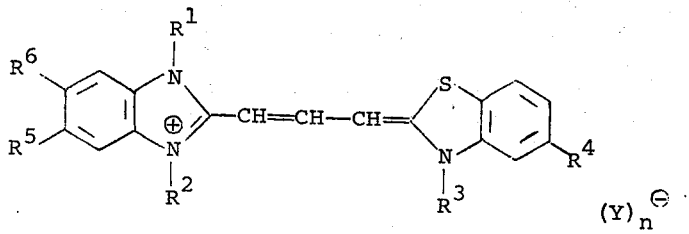

wherein $R^1$ and $R^2$ are lower alkyl; $R^3$ is sulfoalkyl or carboxyalkyl each having an alkylene chain of from 1 to 4 carbon atoms inclusive; $R^4$ is hydrogen, halogen, lower alkyl, lower carbalkoxy, lower alkoxy or acetamido; $R^5$ is halogen, cyano or carbalkoxy; $R^6$ is hydrogen or halogen; Y is an anion customary in the cyanine dye art; and $n$ is 0 or 1.

2. A photosensitive silver halide emulsion as defined in claim 1 wherein said benzimidazolo-thiacarbocyanine dye is:

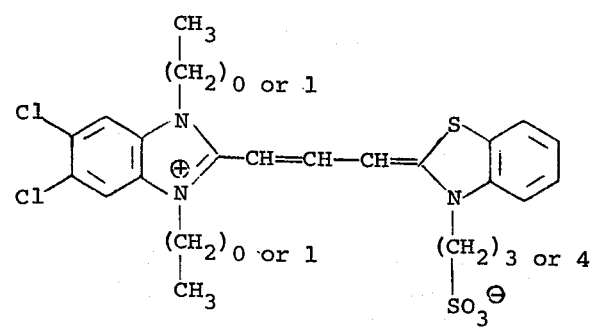

3. A photosensitive silver halide emulsion as defined in claim 2 wherein said dye is anhydro-5,6-dichloro-1,3-diethyl-3′-(4″-sulfobutyl)-benzimidazolothiacarbocyanine hydroxide.

4. A photosensitive silver halide emulsion as defined in claim 1 wherein said benzimidazolo-thiacarbocyanine dye is anhydro-5-cyano-1,3-diethyl-3′-(3″-sulfopropyl)benzimidazolothiacarbocyanine hydroxide.

5. A photosensitive silver halide emulsion as defined in claim 1 which further includes a dye of the formula:

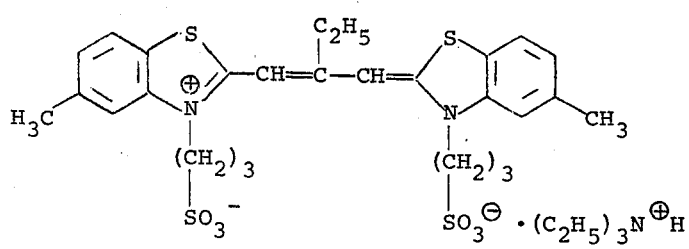

6. A photosensitive silver halide emulsion as defined in claim 1 which further includes at least one 2'-cyanine dye of the formula:

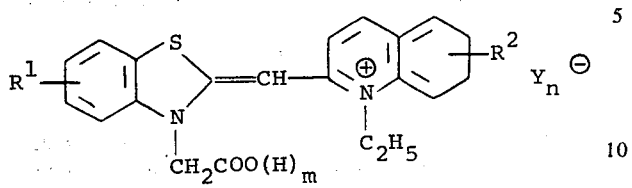

wherein $R^1$ and $R^2$ are each a hydrogen atom or $-OCH_3$; Y is an anion; and m is 0 when n is 0, or M is 1 when n is 1.

7. A photosensitive silver halide emulsion as defined in claim 6 wherein said silver halide emulsion includes a 2'-cyanine dye of the formula:

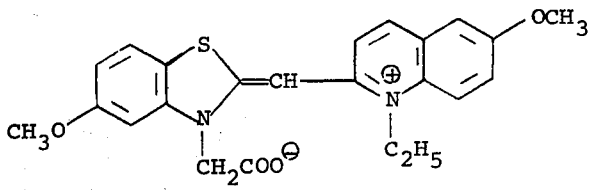

and a 2'-cyanine dye of the formula:

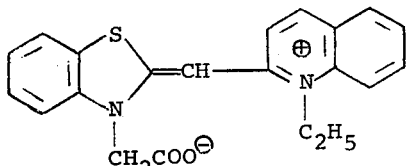

8. A photosensitive silver halide emulsion as defined in claim 1 having associated therewith a dye which is a silver halide developing agent.

9. A photosensitive silver halide emulsion as defined in claim 8 wherein said dye is a magenta dye developer.

10. A photosensitive element comprising a support having thereon at least one layer containing a photosensitive silver halide emulsion of claim 1.

11. A photosensitive element comprising a support having thereon at least one layer containing a photosensitive silver halide emulsion of claim 2.

12. A photosensitive element as defined in claim 11 wherein said silver halide emulsion has associated therewith a magenta dye developer.

13. A photosensitive element comprising a support having thereon at least one layer containing a photosensitive silver halide emulsion of claim 5.

14. A photosensitive element comprising a support having thereon at least one layer containing a photosensitive silver halide emulsion of claim 7.

* * * * *